Patented May 13, 1924.

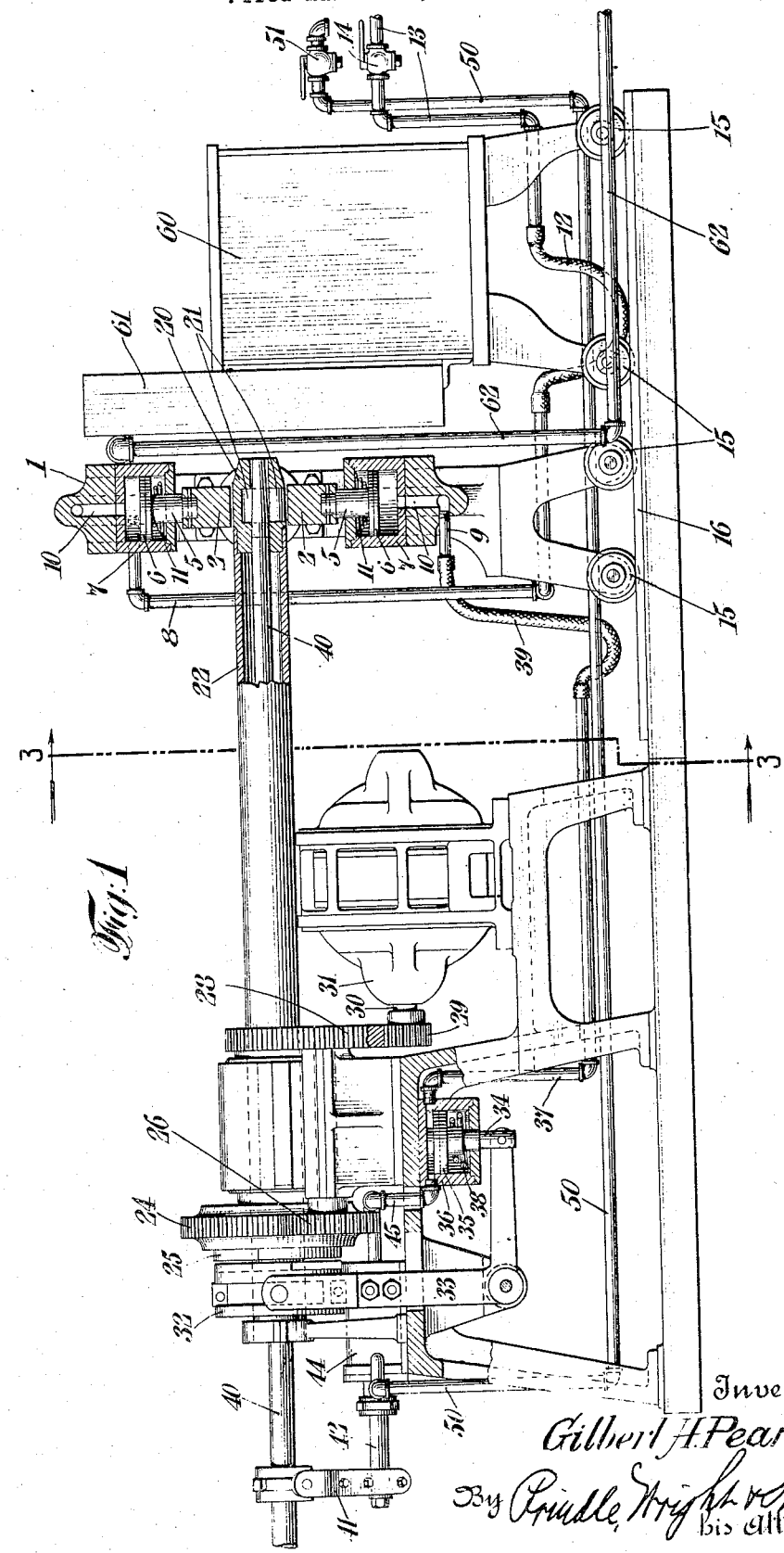

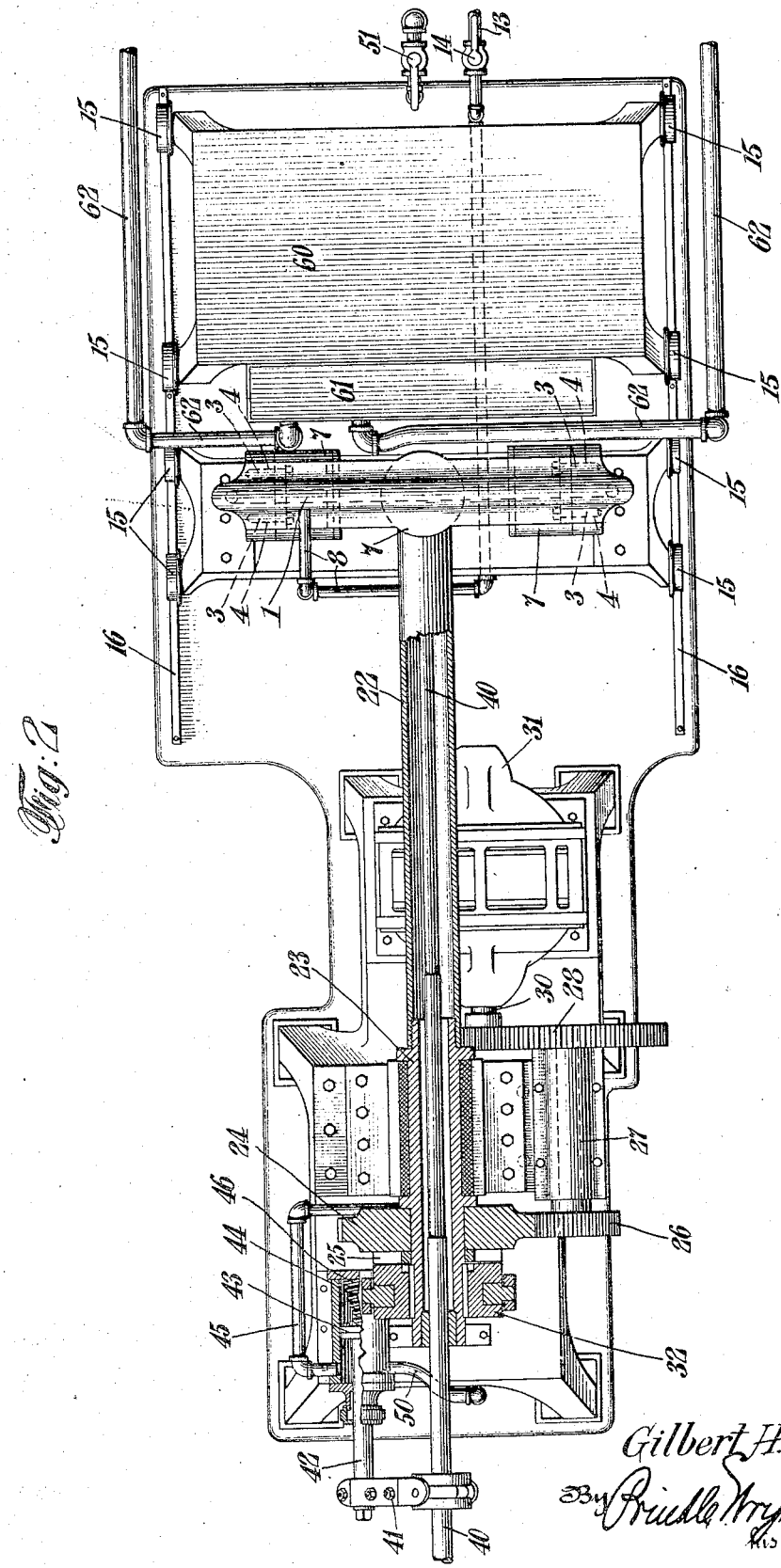

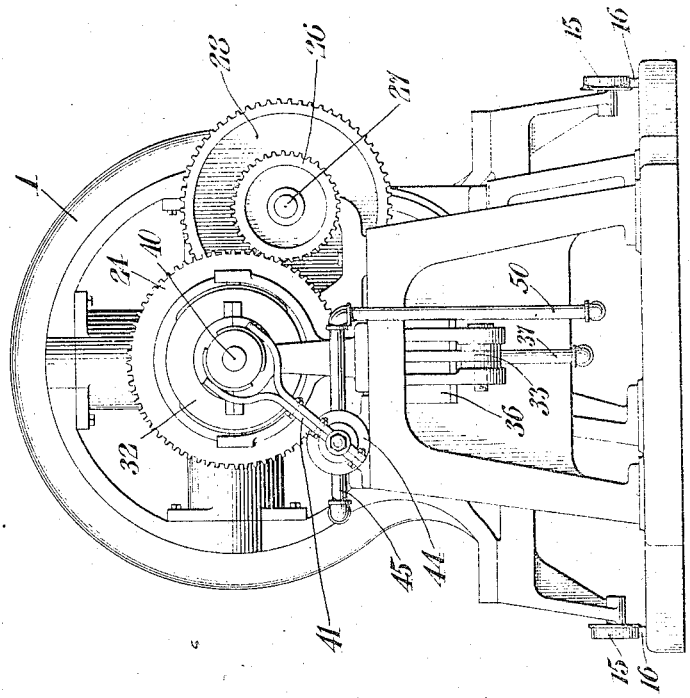
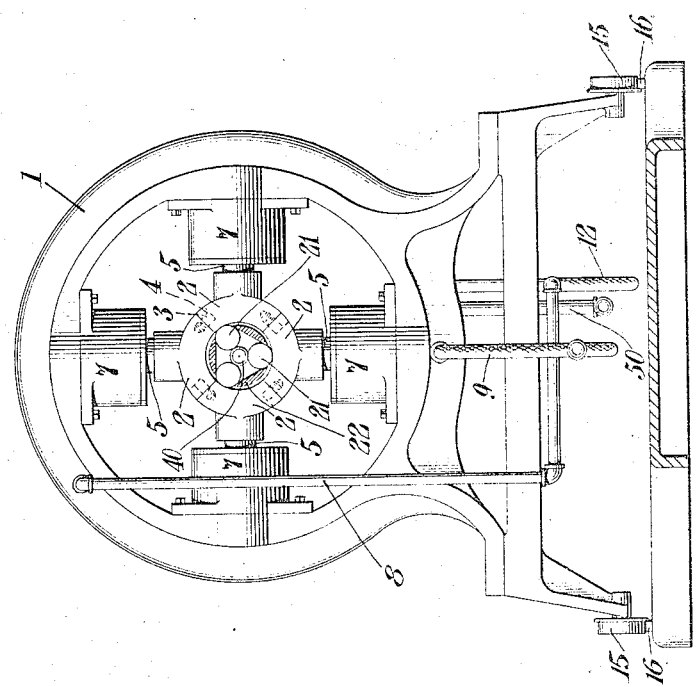

1,493,643

UNITED STATES PATENT OFFICE.

GILBERT H. PEARSALL, OF NEW YORK, N. Y., ASSIGNOR TO FLUE WELDER CORPORATION, OF ALBANY, NEW YORK, A CORPORATION OF NEW YORK.

APPARATUS AND PROCESS FOR WELDING TUBULAR BODIES.

Application filed March 24, 1916. Serial No. 86,350.

*To all whom it may concern:*

Be it known that I, GILBERT H. PEARSALL, a citizen of the United States, and resident of New York, in the county of New York and in the State of New York, have invented a certain new and useful Improvement in Apparatus and Process for Welding Tubular Bodies, and do hereby declare that the following is a full, clear, and exact description thereof.

My invention relates to an apparatus and process for welding tubular bodies and has for its object to weld tubular pieces end to end of any diameter or length such, for example, as pipes, tubes, or flues, or to form, shape, or weld such bodies in any desired manner.

A further object of my invention is to weld tubular bodies end to end so that the external or internal diameter of the welded portions may be of any desired dimension.

A further object of my invention is to take out distortions in tubular bodies.

The welding of tubular bodies end to end has been accomplished heretofore by an internal die or anvil and external hammers or rollers. The internal die or anvil necessarily must be smaller than the tubular body in order to permit the removal of the tubular body from the internal die or anvil after the tubular body has cooled. This causes the welded portion to be smaller in diameter than the rest of the tubular body, which is objectionable. In boiler flues, for example, the restricted portion causes an increase in velocity of the gases at the restricted portion, thereby reducing their heating effect.

Other and further objects of my invention will be apparent from the following description and from an examination of the accompanying drawings of one embodiment thereof in which Figure 1 is a side elevation of said embodiment, partly in section;

Figure 2 is a plan of the embodiment shown in Figure 1, partly in section;

Figure 3 a vertical section taken on the line 3—3 of Figure 1 looking in the direction of the arrows; and Figure 4 an end elevation of the embodiment shown in Figure 1 looking from the left of said figure.

Similar reference characters refer to similar parts throughout the drawings.

The embodiment illustrated in the drawings comprises a die or clamping head 1 having any desired number of die segments 2. Each segment 2 is provided on one contacting side with a pin 3 (Fig. 3) and on the other contacting side with a slot 4, the pin 3 of one segment being adapted to work in the slot 4 of the adjacent segment in order to insure proper alignment of the segments.

Each die segment 2 preferably is connected to a piston rod 5 of a piston 6 in a cylinder 7. Fluid or gas is supplied to the cylinders by an inlet pipe 8 and is carried away by an outlet pipe 9, the cylinders being connected by passages 10. Compressed air has been found to furnish a satisfactory piston operating medium. A spring 11 normally maintains the piston in such position as to hold the segments in open or inoperative position. Inlet pipe 8 is connected to a pipe 13 having a valve 14 therein and leading to a source of fluid or gas supply, by a flexible connection 12. Die or clamping head 1 and the furnace 60 preferably are mounted on wheels 15 engaging a track 16 (if desired) so that said die and said furnace can be moved with reference to the rest of the apparatus, in order to accommodate varying lengths of tubular bodies, in manner to be described hereinafter.

Within the open space of die 1 is an expanding head 20 of any desired type, mounted on a hollow shaft 22, which shaft preferably is detachably secured to an elongated sleeve 23, as by screw threads (Fig. 2). In the embodiment illustrated, expanding head 20 is of the expanding roller type with rollers 21 (Fig. 1). Sleeve 23 (Fig. 2) has a gear 24 loosely mounted thereon provided with a clutch member 25. Gear 24 meshes with a pinion 26 fixed on a shaft 27 on which also is fixed a gear 28 which meshes with a pinion 29 (Fig. 1) on a shaft 30 of motor 31.

On said elongated sleeve 23 (Fig. 2) is splined a sliding clutch member 32 adapted to cooperate with clutch member 25 of gear 24. Said clutch member 32 is operated by a bell crank lever 33 (Fig. 1) connected to a piston rod 34 of a piston 35 in the cylinder 36. A pipe 37 to said cylinder operates said piston, a spring 38 tending normally to maintain said piston in such position that the clutch members 25 and 32 are disconnected. Pipe 37 is connected to outlet pipe 9 of the die of clamping head 1 by a flexible connection 39.

Rollers 21 of expanding head 20 are spread by a tapering mandrel 40, which is adapted to be fed into the roller head by a clamp 41 (Fig. 2) connected to a piston rod 42 of a piston 43 in a cylinder 44. A pipe 45 (Figures 1 and 2) leading from cylinder 36 supplies fluid or gas to cylinder 44, the piston being maintained by a spring 46 in such position as normally to hold mandrel 40 in retracted position. An additional pipe 50 leading to a source of supply and having a valve 51 therein also supplies fluid or gas to said cylinder 44.

Adjacent die or clamping head 1 is a furnace 60. A suitable protective device 61 of any desired type is provided between furnace 60 and die or clamping head 1 to protect the latter from heat. A water cooling chamber fed by pipes 62 is indicated for purposes of illustration.

When it is desired to weld two tubular sections together, the ends are placed in contact in any desired manner, such as by flaring the end of one or by compressing the end of the other, or by both, and the two contacting ends heated in furnace 60. The sections then are slid over hollow shaft 22 until the ends to be welded are within die 1. Valve 14 then is opened, admitting gas or fluid to cylinders 7 and operating die segments 2 which close over the heated edges and fix the external diameter of the welded portion.

The gas or fluid after passing through cylinders 7 to outlet pipe 9 passes through flexible connection 39 and pipe 37 to cylinder 36, operating piston 35 therein and causing clutch member 32 to engage with clutch member 25 on gear 24. Motor 31 already having been set in operation, elongated sleeve 23 and hollow shaft 22 revolve, thus causing expanding head 20 and its rollers 21 also to rotate.

The gas or fluid passes from cylinder 36 through pipe 45 to cylinder 44, where it operates piston 43 to force forward or feed mandrel 40 between rollers 21, thereby expanding the same to any desired extent. Pipe 50 having valve 51 supplies additional force to piston 43 if it is desired or necessary. The preferred order of operation in the embodiment illustrated is first the closing of the die; next the rotation of the roller head; and last, the expansion of the roller head. The apparatus may be operated in any other desired manner instead of valves, if desired.

The movement of tapering mandrel 40 can be varied to increase the internal diameter of the welded portion to any extent desired. Although this may be accomplished by any desired means, the changing of the position of clamp 41 on mandrel 40, or on piston rod 42, or both, furnishes a ready means of adjustment in the present embodiment. As the die also can be modified or changed, it thus is possible to obtain any desired external and internal diameter of the welded portions thereby ensuring a weld true and flush with adjacent portions. It is to be understood that tubular bodies of any diameter may be welded by the utilization of the invention, and that parts having the size and function necessary to accomplish the desired result will be provided.

Distortions in a tubular body can be removed by heating the distorted portion, and proceeding as in the welding operation.

For handling various lengths of tubular bodies, it may be advantageous to provide means for varying the distance of expanding head 20 from elongated sleeve 23. This may be accomplished in any desired manner, as, for example, by providing hollow shafts 22 of varying lengths, which are detachably secured to elongated sleeve 23 as described above. Clamping head 1 and furnace 60 can be moved to correspond to the length of hollow shaft provided, the flexible tube connections 12 and 39 permitting this movement. Although clamping head 1 and furnace 60 generally are moved together and can be mounted on a single moveable platform if desired, the separate mounting of the same permits the individual moving of either if the exigencies of use so require.

Many modifications of my invention will be apparent to those skilled in the art without departing therefrom or from the scope of the claims, the embodiment described being illustrative only of many embodiments by which the external and internal diameter of the welded portion can be varied to obtain any desired result. The invention likewise is capable of uses other than welding, such, for example, as increasing or decreasing the diameter of the end of a tubular body either in the form of straight line offsets or of tapering or curved portions, the last named requiring merely the substitution of dies and expanders of desired shape in place of dies and expanders of the shape disclosed in the present embodiment.

Having described one embodiment of my invention what I claim is:

1. In an apparatus for welding tubular bodies, means to weld the contacting ends of tubular bodies comprising means to fix the external diameter of the welded portion and internal means to maintain the internal diameter of the tubular body at the welded portion as large as the unwelded portion.

2. In an apparatus for welding tubular bodies, means to weld the contacting ends of tubular bodies comprising means to fix the external diameter of the welded portion and means to make the internal diameter of the welded portion equal to the internal diameter of the rest of the tubular body.

3. In an apparatus for welding tubular bodies, means to weld the contacting ends of tubular bodies comprising means to fix the external diameter of the welded portion, and internal means to weld the contacting ends and to maintain the desired internal diameter of the welded portion equal to that of the tubular bodies.

4. In an apparatus for welding tubular bodies, means to weld the contacting ends of tubular bodies comprising an external die and an internal expander.

5. In an apparatus for welding tubular bodies, means to weld the contacting ends of tubular bodies comprising an external sectional die and an internal expander.

6. In an apparatus for welding tubular bodies, means to weld the contacting ends of tubular bodies comprising an external sectional die provided with devices to ensure alignment thereof, and an internal expander.

7. In an apparatus for welding tubular bodies, means to weld the contacting ends of tubular bodies comprising an external die and an internal roller expander.

8. In an apparatus for welding tubular bodies, means to weld the contacting ends of tubular bodies comprising an external die, an internal expander, and means whereby the longitudinal position of said die and said expander may be varied.

9. In an apparatus for welding tubular bodies, means to weld the contacting ends of tubular bodies comprising an external die, an internal expander, and means whereby said die and said expander may have relative longitudinal movement.

10. In an apparatus for welding tubular bodies, means to weld the contacting ends of tubular bodies comprising an external die, a furnace, an internal expander, and means whereby said die and said furnace may have longitudinal movement.

11. In an apparatus for welding tubular bodies, means to weld the contacting ends of tubular bodies comprising an external die, a hollow tube provided with a roller head centered in said die, means to rotate said tube, and means to expand said roller head.

12. In an apparatus for welding tubular bodies, means to weld the contacting ends of tubular bodies comprising an external die, a detachable hollow tube provided with a roller head centered in said die, means to rotate said tube, and means to expand said roller head.

13. In an apparatus for welding tubular bodies, means to weld the contacting ends of tubular bodies comprising an external die, a hollow tube provided with a roller head centered in said die, means to rotate said tube, a tapering mandrel for said roller head, and means to feed said mandrel to expand said roller head.

14. In an apparatus for welding tubular bodies, means to weld the contacting ends of tubular bodies comprising an external die, an internal expander, a tapering mandrel, means to close said die, means to rotate said internal expander, and means to feed said mandrel in said roller head.

15. In an apparatus for welding tubular bodies, means to weld the contacting ends of tubular bodies comprising means to make the external diameter of the welded portion of any desired dimension and means to make the internal diameter of the welded portion of any desired dimension with respect to the internal diameter of the tubular bodies.

16. In an apparatus for welding tubular bodies, means to weld the contacting ends of tubular bodies comprising an external die, an internal expander, a mandrel for said expander, and means to cause relative rotation of said expander and said mandrel.

17. In an apparatus for welding tubular bodies, means to weld the contacting ends of tubular bodies comprising an external die, an internal expander, a mandrel for said expander and means to adjust the movement of said mandrel.

18. In an apparatus for welding tubular bodies, means to weld the contacting ends of the tubular bodies comprising an external die, an internal expander, means to support said expander, and a mandrel extending to the rear of said support.

19. In an apparatus for welding tubular bodies, means to weld the contacting ends of tubular bodies comprising an external die, an internal expander, a hollow tube to support said expander, and a mandrel extending through said tube.

20. In an apparatus for welding tubular bodies, means to weld the contacting ends of tubular bodies comprising an external die, an internal expander, and means to support said expander.

21. In an apparatus for welding tubular bodies, means to weld the contacting ends of tubular bodies comprising an external die, an internal expander, and means to cause said die and said expander to have relative rotation.

22. In an apparatus for welding tubular bodies, means to weld the contacting ends of tubular bodies comprising a sectional external die, an internal expander, and air pressure means to operate said die.

23. In an apparatus for welding tubular bodies, means to weld the contacting ends of tubular bodies comprising an external die, an internal expander, a mandrel for said expander, and air pressure means for moving said mandrel.

24. In an apparatus for welding tubular bodies, means to weld the contacting ends of tubular bodies comprising an external die, and an internal expander comprising a shaft, a roller head on said shaft, and means to rotate said shaft.

25. In an apparatus for welding tubular bodies, means to weld the contacting ends of tubular bodies comprising an external die, an internal expander comprising a shaft, a roller head on said shaft, means to rotate said shaft, and an expander extending to the rear of said shaft.

26. In an apparatus for welding tubular bodies, means to weld the contacting ends of tubular bodies comprising an external die, air pressure means to open and close said die, an internal expander, means to rotate said expander comprising a clutch operated by air pressure means, a mandrel, air pressure means to reciprocate said mandrel, a pipe connecting said die operating air pressure means with a source of compressed air supply, a pipe connecting said die operating air pressure means with said clutch operating air pressure means, and a pipe connecting said clutch operating air pressure means with said mandrel operating air pressure means.

27. In an apparatus for welding tubular bodies, means to weld the contacting ends of tubular bodies comprising an external die, air pressure means to open and close said die, an internal expander, means to rotate said expander comprising a clutch operated by air pressure means, a mandrel, air pressure means to reciprocate said mandrel, a pipe connecting said die operating air pressure means with a source of compressed air supply, a pipe connecting said die operating air pressure means with said clutch operating air pressure means, a pipe connecting said clutch operating air pressure means with said mandrel operating air pressure means, and an auxiliary pipe connecting said mandrel air operating means with a source of compressed air supply.

28. In an apparatus for welding tubular bodies, means to weld the contacting ends of tubular bodies comprising an external die, air pressure means to open and close said die, an internal expander, means to rotate said expander comprising a clutch operated by air pressure means, a mandrel, air pressure means to reciprocate said mandrel, a pipe connecting said die operating air pressure means with a source of compressed air supply, a pipe connecting said die operating air pressure means with said clutch operating air pressure means, a pipe connecting said clutch operating air pressure means with said mandrel operating air pressure means, and flexible connections in said pipes whereby said external die can be moved without disconnecting said pipes.

29. In a welding and forming apparatus an external die, means to open and close said die, an internal expander within said die, means to increase the diameter of the operative surface of said expander, and means to rotate said expander.

30. The process of welding tubular bodies which consists in contacting the heated ends to be welded, fixing the desired outside diameter of the welded portion, and then increasing the inside diameter of the welded portion until said portion is of desired diameter.

31. The process of welding tubular bodies which consists in contacting the heated ends to be welded, fixing the desired outside diameter of the welded portion, and then diminishing by internal expansion the thickness of said welded portion until the weld is of desired thickness.

In testimony that I claim the foregoing I have hereunto set my hand.

GILBERT H. PEARSALL.